Figure 10:
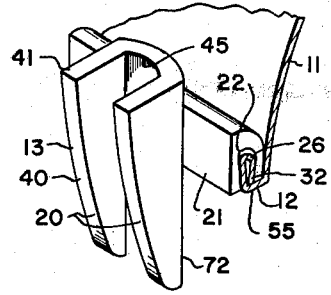

June 22, 1965  V. L. BARR  3,189,970
CLAMPING SEALING APPARATUS
Filed Aug. 16, 1961  3 Sheets-Sheet 1
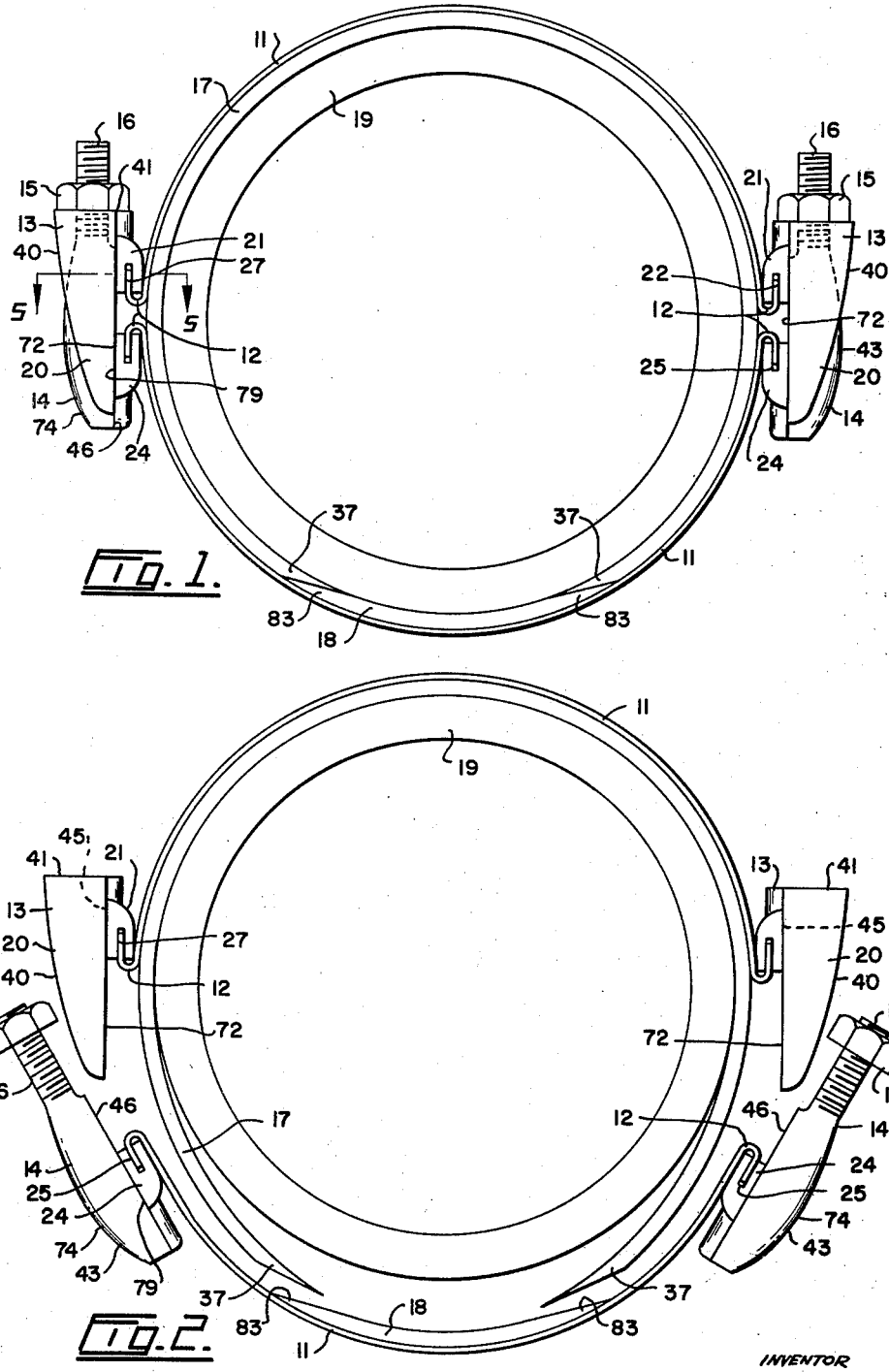
INVENTOR
VERNON L. BARR
BY
Fetherstonhaugh & Co.
ATTORNEYS June 22, 1965 V. L. BARR 3,189,970
CLAMPING SEALING APPARATUS
Filed Aug. 16, 1961 3 Sheets-Sheet 2
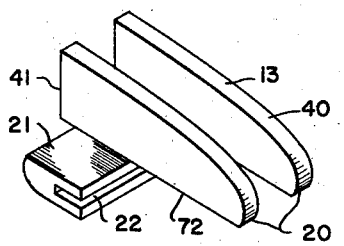
Fig. 3.
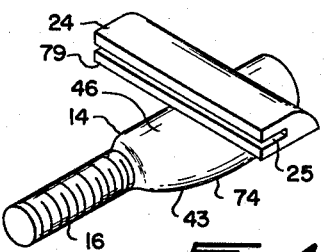
Fig. 4.
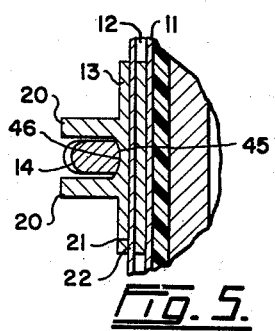
Fig. 5.
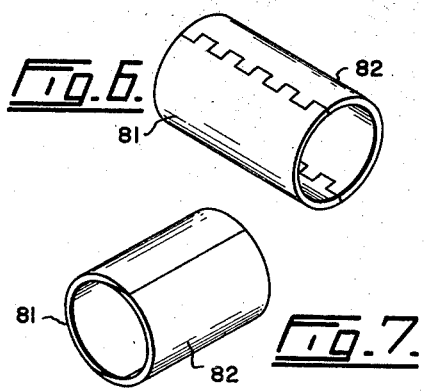
Fig. 6.
Fig. 7.
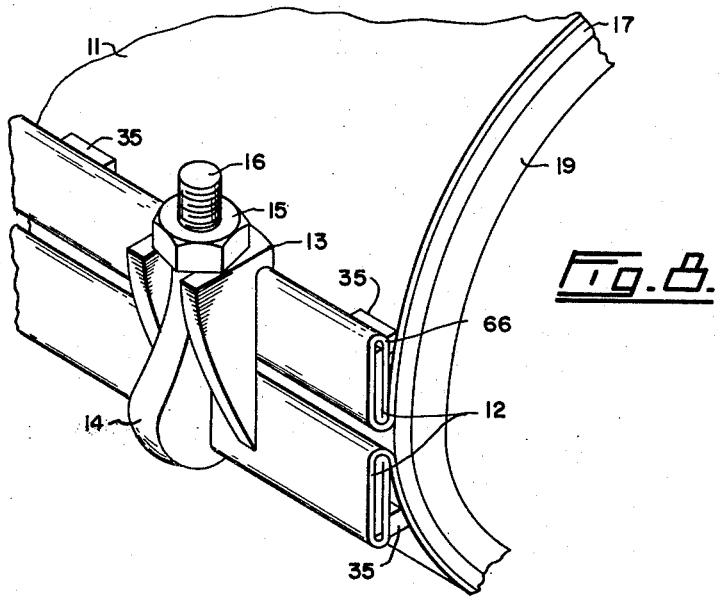
Fig. 8.
INVENTOR
VERNON L. BARR
BY
Fetherstonhaugh & Co.
ATTORNEYS June 22, 1965  V. L. BARR  3,189,970

CLAMPING SEALING APPARATUS

Filed Aug. 16, 1961  3 Sheets-Sheet 3

INVENTOR
VERNON L. BARR
BY
Fetherstonhaugh & Co.
ATTORNEYS

United States Patent Office 3,189,970
Patented June 22, 1965

3,189,970
CLAMPING SEALING APPARATUS
Vernon L. Barr, 3382 W. 8th Ave., Vancouver,
British Columbia, Canada
Filed Aug. 16, 1961, Ser. No. 131,918
4 Claims. (Cl. 24—284)

This invention relates to clamping apparatus, and especially to pipe repair clamps.

When leaks occur in pipes or pipe couplings, it is sometimes difficult to detach sections of the pipe in order to have the leaks repaired. This is especially true when access to the pipe is limited, as in the case of underground pipe. Also, it is sometimes undesirable to cut off the flow of fluid through the pipe for the length of time required to make the repair. In such instances, repairs are made to the pipe in situ. A simple method of making such a repair is to apply a suitable sealing gasket to the pipe in the vicinity of the leak, and to clamp the gasket onto the pipe by a suitable clamping means so that the leak is sealed.

Commonly, pipe repair clamps for repairing leaks in pipes have included suitable flexible gaskets surrounded by a pair of opposing flexible semi-cylindrical metal bands which are clamped together by cast or forged clamping lugs attached to the band. Nuts and bolts threading or engaging the lugs are used to apply the clamping force.

The pipe clamps known in the art have suffered from a number of disadvantages. The gaskets in such clamps tend to become deformed or loosened when the bands are clamped together. This occurs especially when there is some movement of the bands around the pipe during the clamping operation. Previously known pipe clamps have made use of nuts and bolts to provide the clamping force, and as a result, in some of these known clamps, the bolts are subject to severe stresses which tend to break the bolts. When the edges of the bands do not quite meet, as in the case where the pipe diameter is somewhat larger than the normal diameter for which the clamp is designed, metallic inserts sometimes referred to as "armour" are placed over the uncovered gasket with their edges held under the bands so as to provide a complete metallic covering for the gasket. However, the shape of previously known inserts has developed undesirable stresses in the bands and the armour has tended, together with the gasket, to bulge outwards between the edges of adjacent bands.

It is an object of the present invention to provide, in combination with pipe clamping apparatus, a sealing gasket which does not become loosend or distorted while the pipe is being clamped.

A further object of the present invention is to provide pipe clamping apparatus in which a clamping lug is provided with a threaded extension to which a nut can be attached, which is less likely to break under stress than an independent bolt.

It is a further object of the invention to provide a clamping lug having a profile such that a nut threadably attached to a co-operating clamping lug is able to slide along the profile and finally to snap into place against the profiled lug.

It is a further object of the invention to provide co-operating clamping lugs having abutment faces which bear the radial stresses induced by tightening the clamp, so that transverse shearing stresses sufficient to break the threaded member clamping the lugs together, do not tend to develop in the threaded member.

It is a further object of the present invention to provide apparatus for clamping pipe and the like which makes possible an efficient clamping action which does not tend to loosen or distort the sealing gasket.

It is a further object of the present invention to provide an armour insert for use in pipe clamping apparatus which allows more uniform stress about the circumference of the pipe, and which does not tend to bulge out between the edges of adjacent bands.

Yet another object is the provision of clamping apparatus of the nature described that does not have any loose bolts that have to be held in position or that can become displaced from the apparatus.

Figure 11:
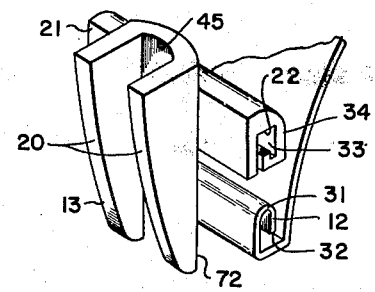
Figure 12:
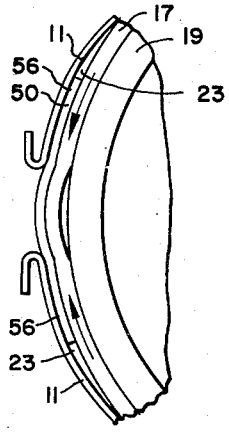
Figure 13:
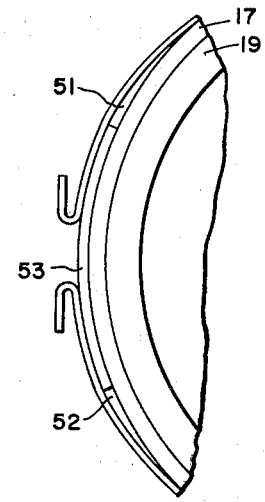
Figure 9:
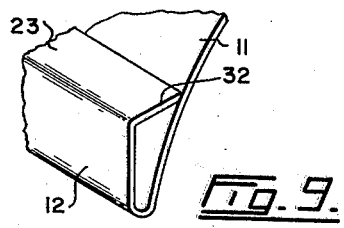

The invention will now be described with reference to the accompanying drawings, in which, FIGURE 1 is an end view of a clamp constructed according to the present invention and shown mounted on a pipe, FIGURE 2 is an end view of the clamping device in an unclamped condition and illustrating a preferred method of clamping the lugs together, FIGURE 3 is a perspective view of one of the clamping lugs of this clamping device, FIGURE 4 is a perspective view of the other of the clamping lugs, FIGURE 5 is a section view taken along the line 5—5 of FIGURE 1, FIGURE 6 and FIGURE 7 illustrate unsatisfactory sealing gaskets known in the prior art, FIGURE 8 is a detailed perspective view shown an alternative construction of the clamping lugs and bands of the clamping device, FIGURE 9 illustrates an alternative band edge construction, FIGURE 10 is a detail end view shown an alternative manner in which a clamping lug may be attached to a clamping band, FIGURE 11 shows an exploded view of a further alternative construction for the band and lug attachment, FIGURE 12 illustrates an unsatisfatcory type of armour insert known in the prior art, and FIGURE 13 is an illustration of an armour insert constructed according to the invention.

The clamping device according to the present invention includes two substantially semi-cylindrical metal bands 11 having longitudinal side edges that are shaped to form lips or flanges 12. Bands 11 are opposed to each other with a pair of side edges at each side of the device and to which opposing lugs 13 and 14 are attached. Clamping action is provided at each side of the device by a nut 15 which screws onto a threaded extension 16 of the lug 14. Inside bands 11 are flexible gaskets 17 and 18 of rubber, neoprene or the like, which are adapted to seal any leak in the pipe or coupling on which the clamping device is mounted. The clamping device is shown in FIGURE 1 as clamping a section of pipe 19.

The lug 13 is shown in more detail in FIGURE 3. It includes a pair of bracing legs 20 integral with the lug, the back of the lug and the legs having a U-cross section as shown in FIGURES 10 and 11. The legs are spaced apart by a distance at least equal to the width of the threaded leg 16 of the lug 14. The lug 13 also is provided with a gripping bar 21 integral with the lug. The gripping bar 21 is provided with a slot 22 into which a lip 12 of either one of the clamping bands 11 is adapted to fit.

The top of the lug 13 is a smooth abutment surface 41 on the shoulder formed by the back and legs, against which surface a nut threaded onto the extension 16 of the lug 14 may be tightened. The rear edges 72 of the leg 20 are also smooth surfaces adapted to bear against the gripping bar of the lug 14. The front edges of the legs 20 are curved to form smooth tapered profiles 40 extending from near edges 72 at the lower ends of the legs outwardly and upwardly to abutment surfaces 41 and spaced outwardly from said edges 72. This allows a nut 15 attached to the threaded extension 16 on the lug 14 to slide along the curved profile and to snap into place against the abutment face 41.

The lug 14 is illustrated in detail in FIGURE 4. The lug 14 is provided with a threaded extension leg 16 of circular cross-section and integral with the lug. The lug 14 also has a gripping bar 24 similar to the gripping bar 21 on the lug 13. A slot 25 is provided in the gripping bar so that the lug may be attached to the lip 12 of either one of the side bands 11. The rear or outer surface 74, see FIGURE 1, of the lug 14 is curved to thicken the lug and provide additional strength. The front or inner surface 46 of the lug 14 is a plane abutment surface adapted to bear against the gripping bar 21 of the lug 13. The threaded leg 16 is disposed slightly behind the front surface 46 of the lug 14, as can be seen in FIGURE 1.

The manner in which the lugs 13 and 14 fit onto the clamping bands 11 is shown in FIGURE 1. A hooking action is obtained by the fitting of the protruding end 27 of the lip 12 into the recess 22 or 25 in the gripping bar of a lug. If desired, the gripping bar may be welded onto the lip 12. Alternatively, the lip may be folded over on itself as shown in FIGURE 10. In this figure it is seen that as the lug 13 is forced downwards by the clamping action of the nut 15, the bent portion 26 of the lip 12 engages the recess 22 in an increasingly tight manner. The section 55 of band lip material extending horizontally away from the clamp exerts pressure against the edge of the band metal 32 thereby jamming the metal fold 26 into the slot 22. This feature combined with the double bend in the lip makes it impossible to pull the band out under tightening or pressure.

A further alternative form of construction is shown in FIGURE 11 in an exploded view, in which the slot 22 as well as the lip has a hook shape. When the slot engages the lip, downward pressure on the lug 13 causes the bend 31 of the lip 12 to curl, forcing the edge 32 of the lip against the recess 33. This action thus tends to tighten the lug on the band rather than to loosen it. This construction has the further advantage that the lug can be slid onto the lip 12 of the band and then a sharp blow with the hammer on the right hand side 34 of the gripping bar will tighten the lug onto the band, no welding being required.

Extreme tightening of the clamp can cause the lip 12 of the band 11 to deflect outwardly from the band. To prevent this outward bending, a series of spacers 35 may be provided between the band and the outer end 66 of the folded lip 12 as shown in FIGURE 8. These spacers may conveniently be welded to both the band and the lip. Alternatively, the construction shown in FIGURE 9 might be adopted in which parts of the lip 12 are bent so that parts of the end 32 of the lip bears against the curved surface of the band, each part of the lip forming a horizontal bracing section 23. The end 32 of the lip may conveniently be welded to the band.

Another alternative design involves casting the lugs and bands together as an integral unit. The lower band and the lugs 14 might be cast as one unit, and the upper band together with the lugs 13 could be cast as a co-operating clamping unit. The curved profile of the lugs 13 would permit easy interlocking of the two units by allowing nuts threaded onto the end of the threaded extension 16 on the lugs 14 to ride up the profile, snapping into place against the abutment surface 41 of the lugs 13.

Gaskets for sealing leaks in pipes and the like were constructed prior to the present invention in the manner shown in FIGURES 6 and 7. Semi-cylindrical gaskets 81 and 82 were used, the contacting edges being bevelled or tapered or having interlocking fingers thereby to form a good joint. However, when this type of gasket is employed with a clamp, the weight of the clamp on the gasket and the clamp tightening operation tends to distort or loosen the gasket so that a good sealing action is not usually obtained.

According to the present invention, a nearly cylindrical gasket 17 is provided which nearly encircles the pipe, see FIGURES 1 and 2. The lower edges 37 of the gasket 17 are tapered as shown in FIGURE 1, or may be provided with interlocking fingers. Another gasket 18, much smaller than gasket 17, is placed beneath the edges 37 of the gasket 17 so that the tapered edges 83 of the gasket 18 co-operate with the tapered edges 37 of the gasket 17 to form a tight seal when the clamp is tightened. Alternatively, the edge portions 83 may be provided with interlocking fingers. It is found that this gasket arrangement is much less likely to be distorted or loosened when the clamp is applied. This is especially true if the clamp is applied in the manner shown in FIGURE 2. As has been noted, the profile of the lugs 13 is curved so that nuts 15 attached to the ends of the threaded legs 16 of the lugs 14 can simultaneously ride up the curved profiles 40 of the lugs 13 and snap into place against the abutment faces 41 of the lugs 13 when the nuts have reached the upper edges of the legs 20. The nuts can then be tightened on the threaded portions 16 of the lugs 14. The lower band 11 is loose and open while slowly being raised into place, the nuts 15 meanwhile advancing along the curved profile of the lugs 13, thus allowing the gasket 18 to make sealing contact with the gasket 17 without distorting, deforming or loosening the gaskets. This important feature of the invention enables the tapered or fingered edges of the gaskets to engage completely before the slack is taken up. An efficient sealing action is thus obtained.

In some previously known lugs, severe tightening has caused severe bending stresses to be placed on the bolt passing through the lug. This is avoided in the present invention by the unit construction of the lug 14 and by the manner in which the lugs 13 and 14 bear against each other. Both the lugs 13 and 14 are provided with curved back portions 40 and 43, respectively, as shown in FIGURE 1, for example, which thicken the lugs and provide additional strength. Furthermore, the face 46 of the lug 14 bears against the abutment face 45, see FIGURE 5, of the lug 13 so that the bending stress is mainly borne by the two contacting faces of the lugs and not by the threaded portion 16 of the lug 14. Furthermore, it will be seen that in the lug construction shown in FIGURES 3 and 4, the legs 20 of the lug 13 bear against the front abutment faces 79 of the gripping bar 24 of the lug 14.

It is to be noted that when the nut is tightened, a tensile force is applied to lug 14 which acts along a line slightly offset with respect to the axis of the lug in a direction toward a fulcrum for lug 14 located in the vicinity of the associated lip 12. Similarly, a compressive force is applied to lug 13 which acts along a line slightly offset with respect to the axis of the lug in a direction toward a fulcrum for lug 13 located in the vicinity of the associated lip 12. The fact that these forces are offset with respect to the fulcrum points causes bending stress to be set up in each lug. As the opposing lips 12 and gripping bars are of substantially identical configuration, each of the fulcrum points would be located at a substantially equal distance from the center of the gap between the lips. Furthermore, abutment face 46 of lug 14, upon tightening the clamp, tends to swing towards surface 45 which surface, being located on the gripping bar, is therefore, located a fixed distance from the fulcrum point of lug 13 and, correspondingly, a fixed distance from the center of the gap between lips 12. Similarly, abutment face 72 of lug 14, upon tightening of the clamp, tends to swing towards surface 79 which is located a fixed distance from the center of the gap between lips 12. Due to the similar geometrical configuration of the gripping bars it can readily be seen that these two distances are substantially equal. That is, the effective geometrical centers of surfaces 45 and 79 are substantially equi-distant from the center of the gap between lips 12. As these surfaces 45 and 79 respectively engage with abutment faces 46 and 72 of lugs 14 and 13 to resist the tendency of the lugs to swing about their respective fulcrum points, transverse shearing stresses in threaded portion 16 do not tend to develop. Furthermore, there would appear to be substantially equal forces operating between surfaces 72 and 79 and between surfaces 45 and 46. Therefore, upon tightening of the clamp, the movement of the lugs would be translatory toward each other and the clamp would have minimal tendency to pivot with respect to an imaginary pivot point at the center of the gap between the lips.

Alternatively, no gripping bars need be provided, as abutment elements; instead the lip 12 may be folded over a number of times as shown in FIGURE 8, thus providing a stiffened lip which is an abutment element sufficiently strong to bear the stress placed on the lip by the legs 20.

Prior to the present invention, armour inserts such as the armour insert 50 shown in FIGURE 12, were used when the edges of two adjacent bands 11 were appreciably far apart, as in the case of a pipe having a diameter somewhat larger than normal. The inserts had straight edges, leaving gaps 23 on either side of the insert. The stresses imparted to the gaskets and the armour inserts in such a situation tended to compress the gaskets and inserts towards the gap between the bands, causing a pinch or bulge in the gasket and insert as shown. Although there is a tendency for the gasket surface to adhere firmly to the surface of the pipe at the point 56, the gasket is relatively loose nearer the gap between the bands and horizontal compression of the gasket material takes place along the line indicated by the arrows, causing the bulge shown in FIGURE 12. According to the present invention, an armour insert is provided with tapered edges preventing the formation of gaps 23. The tapered edge structure is shown in FIGURE 13. Two tapered edge pieces 51 and 52 might be added to the conventional armour insert 53 as shown in FIGURE 13; but preferably the edge members 51 and 52 are integral with the insert 53. In accordance with the present invention, the tapering or feathering away of the edges of the armour insert prevents any sharp differential compression of the gasket and so allows a much heavier armour insert to be used than heretofore has been possible. The clamping pressure of the band against the gasket is not uniform all the way around the pipe when previously known inserts are used, a lower clamping pressure existing in the armour area. Due to the heavier armour in the arrangement according to the invention, a somewhat oval shape is achieved; and in endeavoring to regain a circular shape on tightening, the outer band exerts more pressure in the armour area where it is needed than would otherwise be the case. It will be noted that the use of the armour insert according to the invention enables the clamp to be used for an extensive variation in pipe diameter for high pressure repairs.

The clamping apparatus according to the present invention is thus seen to be as simple as possible with as few working parts as possible and eliminates the use of a separate bolt. The shapes of the lugs provide reinforcing action, enabling the lugs to undergo severe stresses. The manner in which the abutment faces and side extensions or stiffened band lips are arranged also contributes to the bearing of heavy stresses by the clamping unit. In the clamping unit according to the invention, unduly severe stresses on the threaded portion of the lug 14 do not occur; these stresses are instead borne by other parts of the lug. The curved lug profile on the lug 13 makes possible an efficient clamping procedure, without distorting the gaskets clamped by the bands, the lower lugs 14 preferably being raised together, the nuts 15 snapping into place against the faces 41 of the lugs 13 at the same time.

It is preferable to secure gaskets 17 and 18 to their respective bands 11, as shown in FIGURES 1 and 2. When gasket 17 and its band are placed on the pipe, the gasket hangs in the position shown in FIGURE 2. By spreading lugs 14 as gasket 18 and its band 11 are moved towards the pipe, said gasket 18 is kept clear of gasket 17 until the last moment when nuts 15 spring over shoulders 41, at which time the gaskets are approximately in their fixed positions. Thus, the gaskets do not wrinkle or become displaced when nuts 15 are tightened. When each nut 15 is turned down on its threaded extension 16, it bears against shoulder 41 to draw the adjacent ends of the clamping bands together. As each of the clamping lugs 13 and 14 are connected near their upper and lower ends respectively to the band ends, there is a tendency for opposite ends of the respective lugs to swing inwardly towards the bands. However, the abutment surfaces 72 of legs 20 engage abutment surface 79 of bar 24, and abutment face 46 of lug 14 engages abutment face 45 of bar 21 to prevent this swinging action.

Armour insert 53 may also be secured to the upper band 11 beneath gasket 17. This prevents displacement of the insert, and the spreading of lugs 14 mentioned above keeps the lower band 11 away from the insert until the last moment.

What I claim as my invention is:

1. A sealing clamp comprising a band arrangement adapted to be clamped around an object such as a pipe or the like, said band arrangement having adjacent side edges that are co-extensive and in spaced adjacency when said band arrangement is clamped on an object, a first elongated lug fixedly connected near an inner end thereof to one side edge and extending over the other side edge, said first lug having a free outer end and an inner end having an abutment face, tensioning means on said free outer end, abutment surfaces beside each side of the inner end of the first lug fixedly secured to the latter, a second lug connected near an inner end thereof to said other side edge, said second lug comprising a pair of bracing legs spaced apart sufficiently to permit the first lug to fit therebetween, an abutment surface between the legs near the inner end thereof against which the abutment face of the first lug rests, said legs extending over and having free ends bearing against the abutment surfaces of the first lug, and a shoulder formed by the inner ends of the legs substantially normal to the length thereof against which said tensioning means bears to tighten the clamp, said tensioning means being free to move across said shoulder, said tensioning means drawing the band edges together and drawing the abutment face of the first lug against the abutment surface between said legs, whereby the abutment surface resists the torque action of said first lug as tension is applied to at least minimize transverse shearing stresses in the free outer end of the first lug and said tensioning means drawing the abutment face of the extension legs of said second lug against the abutment surfaces of said first lug whereby the abutment surfaces resist the torque action of said second lug as tension is applied, the effective geometrical centers of said abutment surfaces on said first lug and the effective geometrical center of said abutment surface on said second lug being substantially equi-distant from the center of the space between said side edges to minimize the tendency of the clamp to pivot about a point midway between said edges.

2. A sealing clamp as claimed in claim 1 in which each leg of the second lug has an outer surface remote from the abutment faces of the first lug and inclined inwardly from the shoulder of said second lug to the free end of the leg.

3. A sealing clamp as claimed in claim 1 in which each lug is connected to the side edge of the band arrangement by a gripping bar secured to and extending across said each lug, each gripping bar having a recess therein adapted to receive a protruding lip of said side edge, each lip being folded over on itself within its recess.

4. A clamp according to claim 1 wherein the free outer end of said first lug is threaded and wherein said tensioning means comprises nut means.

References Cited by the Examiner
UNITED STATES PATENTS

| | | | |
|---|---|---|---|
| 1,367,347 | 2/21 | Barnes | 285—41 |
| 2,341,828 | 2/44 | Tetzlaff | 24—279 |
| 2,690,193 | 9/54 | Smith | 285—373 |
| 2,897,568 | 8/59 | Hoke | 24—279 |
| 2,998,629 | 9/61 | Smith | 24—279 |
| 3,089,212 | 5/63 | Graham et al. | 138—99 X |

FOREIGN PATENTS

| | | |
|---|---|---|
| 568,068 | 12/58 | Canada. |
| 47,068 | 9/36 | France. |
| 9,632 | 1906 | Great Britain. |
| 251,728 | 5/26 | Great Britain. |

CARL W. TOMLIN, *Primary Examiner.*

ANDREW JUHASZ, *Examiner.*